Figure 1:
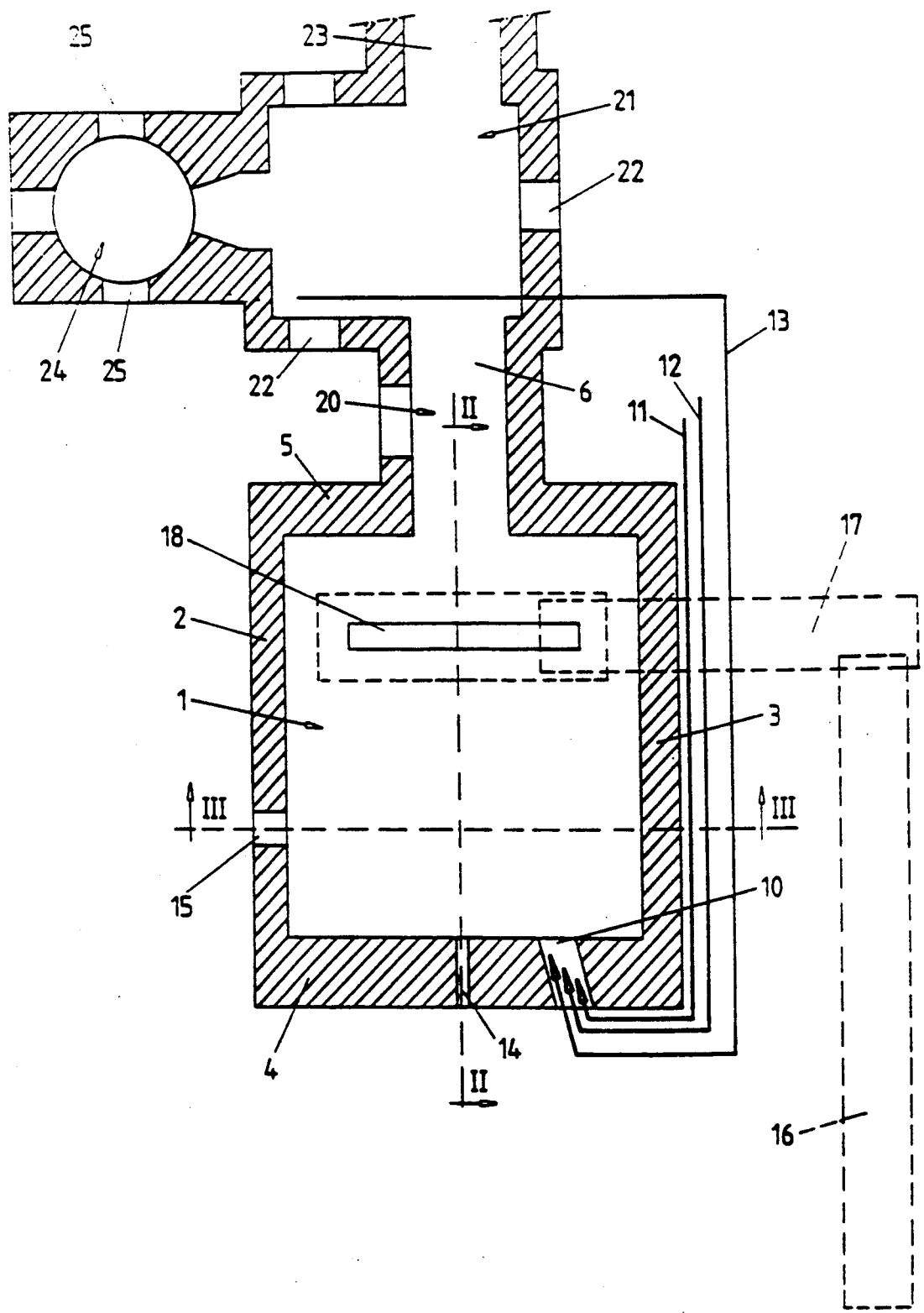

United States Patent [19]

Nevels

[11] Patent Number: 5,128,004
[45] Date of Patent: Jul. 7, 1992

[54] METHOD FOR PROCESSING ASH RESIDUES AS WELL AS GLAZE-KILNS USEFUL THEREIN

[76] Inventor: Leonardus M. M. Nevels, Daalzicht 37, 6097 EK Heel, Netherlands

[21] Appl. No.: 618,255

[22] Filed: Nov. 21, 1990

[30] Foreign Application Priority Data

Nov. 28, 1989 [NL] Netherlands ............ 8902935

[51] Int. Cl.$^5$ ............................................. E25F 1/00
[52] U.S. Cl. .................... 204/141.5; 75/392; 65/19; 55/84; 432/161
[58] Field of Search ............... 110/255, 259; 432/161, 432/210, 211; 204/141.5; 75/392; 65/19; 55/84

[56] References Cited

U.S. PATENT DOCUMENTS

| | | | |
|---|---|---|---|
| 1,994,959 | 2/1929 | Morton | 49/54 |
| 2,078,794 | 4/1937 | Forter | 49/54 |
| 2,078,795 | 4/1937 | Forter | 49/54 |
| 2,539,694 | 1/1951 | McIntyre | 263/11 |
| 2,950,570 | 8/1960 | Cowles et al. | 432/161 |
| 3,620,514 | 11/1971 | Geiger et al. | 432/161 |
| 3,745,941 | 7/1973 | Reilly | 110/8 R |
| 4,602,574 | 7/1986 | Bach et al. | 110/346 |
| 4,882,736 | 11/1989 | Pieper | 373/32 |
| 5,000,098 | 3/1991 | Ikeda et al. | 110/259 |

FOREIGN PATENT DOCUMENTS

| | | |
|---|---|---|
| 0154717 | 3/1988 | European Pat. Off. |
| 546170 | 2/1932 | Fed. Rep. of Germany |
| 1200554 | 9/1965 | Fed. Rep. of Germany |
| 2575271 | 12/1985 | France |
| 52-137427 | 11/1977 | Japan |
| 8902490 | 10/1989 | Netherlands |
| 8902749 | 11/1989 | Netherlands |

*Primary Examiner*—Henry C. Yuen
*Attorney, Agent, or Firm*—Foley & Lardner

[57] ABSTRACT

A method for processing ash residues and other solide combustion products, derived from combustion of waste materials in furnaces whereby the ash and other combustion products are gradually supplied in a continuous manner into the high side of a glaze-kiln, showing a sloping course, which is heated from its lower side, and are fused and glazed in a continuously proceeding process at high temperatures and a glaze-kiln, useful in this method.

15 Claims, 3 Drawing Sheets

METHOD FOR PROCESSING ASH RESIDUES AS WELL AS GLAZE-KILNS USEFUL THEREIN

The invention relates to a method for processing ash residues and other solid combustion products, derived from combustion of waste materials in kilns, as well as a glaze-kiln useful therein.

Waste disposal is one of the most serious problems of these days. In order to be able to cope with the continuously increasing quantities of waste materials, waste is disposed of more and more by means of combustion. In practice, solid and fluid waste materials are predominantly combusted in kilns with a sliding grid, or kilns with a rotating drum, wherein waste materials are combusted continuously. During such a combustion large quantities of ash and slag are formed, which in turn create a problem themselves. In particular for a specific waste material, for example material derived from from the photographic and photochemical industries, the ash residues contain substantial amounts of heavy metals, which may cause serious pollution of the soil. In the earlier, not prepublished Dutch Patent Application No. 89 02749, originating from Applicant, a method and an installation are described for combusting waste materials of various sources in a specific pyrolysis furnace, wherein initially the waste is pyrolysed and subsequently combusted and glown. Waste material, pyrolysed and combusted according to that method, which is especially suitable for processing of materials with a high content of heavy metals, such as photographic waste material, though providing substantially less ash residues which are rich in heavy metals still has the problem of how to dispose off these ash residues. It has been proposed already to immobilise the detrimental metals in these ash residues by compacting and sintering of the ash, but the sinter material obtained will still be a pollutant to the environment by the release of heavy metals.

It is now the object of the present invention to provide a method for processing such ash residues, whereby the heavy metals present are recovered as much as possible, and in the rest are immobilised, obtaining a material suitable as a raw material for concrete, road-building, enamel, spraying grit and the like.

To that end the invention provides a method as described in the introduction, characterised in that the ash and other combustion products are gradually supplied in a continuous manner into the high side of a glaze-kiln, showing a sloping course, which is heated from its lower side, and are fused and glazed in a continuously proceeding process at high temperatures.

The heating in the kiln occurs efficiently by means of a blown flame, conveniently allowing for adequately high temperatures, so that fusing and glazing may occur.

In order to cause, that the ash mixture will comprise sufficient silicates for glass formation, the ash may be mixed with siliceous types of soil, for which efficiently polluted types of soil may be used, since the metals, present therein, will be immobilised as well. In addition, a further in advantage is achieved herewith, that two types of waste, the combustion ashes of furnaces and the polluted soil, are both processed.

It is of importance in such a glazing process, that the viscosity of the fuse of the kiln remains sufficiently low to warrant a regular flow of fluid fuse in the sloping kiln, and also to cause a homogeneity of the fuse. To that end, the viscosity of the fuse of the kiln may be adjusted, if required, by adding supplements to the ash supplied which have a viscosity decreasing action. These supplements may consist of one or more of glass waste, sodium-, potassium- and/or calciumnitrate (Chile saltpetre), borax, sulfates, silicon compounds, fluorides (feldspar), iron and iron compounds respectively. The total content of supplements should be less than 20% by weight, in order to make the fuse not to thin and aggressive, which might cause problems for the walls of the kiln, and will amount preferably to at most 5% by weight. During this glazing process metals will melt, which sink to the bottom of the kiln and will flow down towards the lower side thereof. Fused metal alloy may be drawn off periodically at a draw-off point, located at the lower side of the kiln. Thereby the fused metal alloy is efficiently poured directly into electrolysis anodes, to be subjected subsequently to an electrolytic purification process, whereby metals are purified and separated. These metals are completely suitable again for re-use.

A thin, very liquid layer of metal sulfide is formed on top of the matel fuse during the process, and is in turn covered by a fluid glass slag, which may be drawn off at a suitable drawn-off point, and which will form slag material after cooling and solidifying. The slag material physically and chemically belongs to the glazes, and may be considered as a synthetic obsidian. Obsidian is a vulcanic type of glass, released during vulcanic eruptions, that is used by Indians as material for arrow-heads and tools. This material is hard, and the heavy metals are completely immobilised therein. The material may be used for all kinds of purposes. Amongst others, objects that may be manufactured therefrom include, for example, ashtrays, saucers, ornamental articles. In comminuted form, it is in particular suitable as raw material for concrete, road-building, enamel, spraying grit, etc.

The gases released by the fusing process described above may be purified by gas washing. Efficiently the gas washing may occur by spraying waste liquids of fixing-baths, for example as described in the not prepublished Dutch Patent Application No.89 02490, originating from Applicant, and the like, into the hot gas.

The invention provides in addition a glaze-kiln, wherein the glazing process according to the invention may be applied, which is characterised by a tublike body of the kiln of refractory material, with at the rear side a flue duct, and closed by a lid of separate, refractory elements, which body of the kiln has a bottom, sloping in the longitudinal direction forwards and is concavely arched in the transverse direction, a front wall, provided with a fuel/air inlet, forming a burner, and a draw-off point for fluid metals, mounted in the centre at the lower end, adjacent to the bottom of the oven, two upright side-walls, in one of which a draw-off point for fused glass slag is mounted at the upper side, and a rear wall, provided at the upper side with a discharge for gases, and means for supplying the ash mixture to be glazed at the rear side of the kiln through the lid.

The slope of the bottom of the kilm and the concave profile thereof cause, that the fuse will flow inwards and downwards, whereby superimposed layers will be formed of a fluid metal alloy, a thin flowable metal sulfide layer and glass fuse, so that by efficient mounting of the various draw-off points the metal alloy and the fused glass may be drawn-off periodically in a and full separate manner.

With a view to a proper heat adjustment in the kiln it is preferred that the lid is concavely arched so that heat radiation will be reflected back and will contribute to the temperature of the fuse. By the use of a conveyer system, emerging over a hopper in the lid of the kiln as a supply means, a continuous functioning of the kiln can be arranged in a simple manner.

Figure 2:
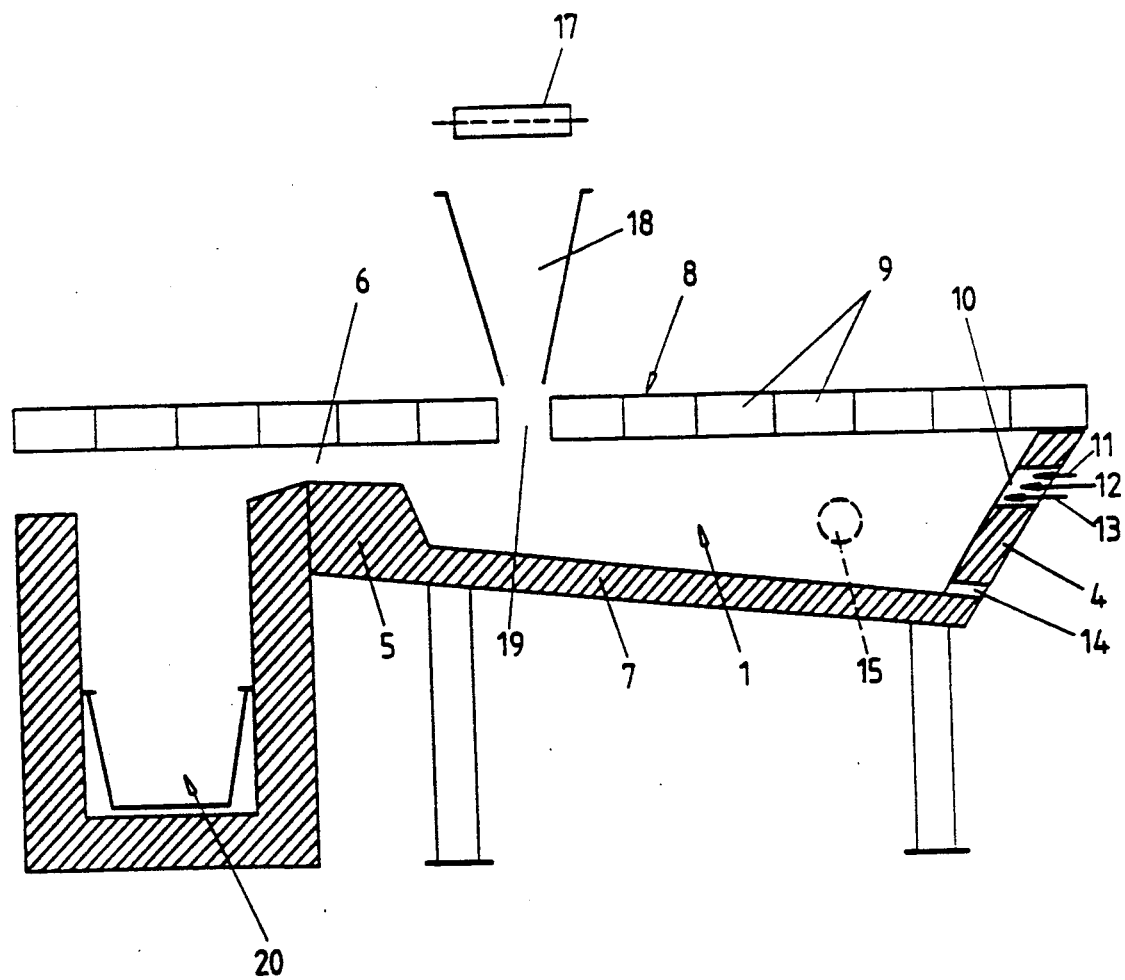
Figure 3:
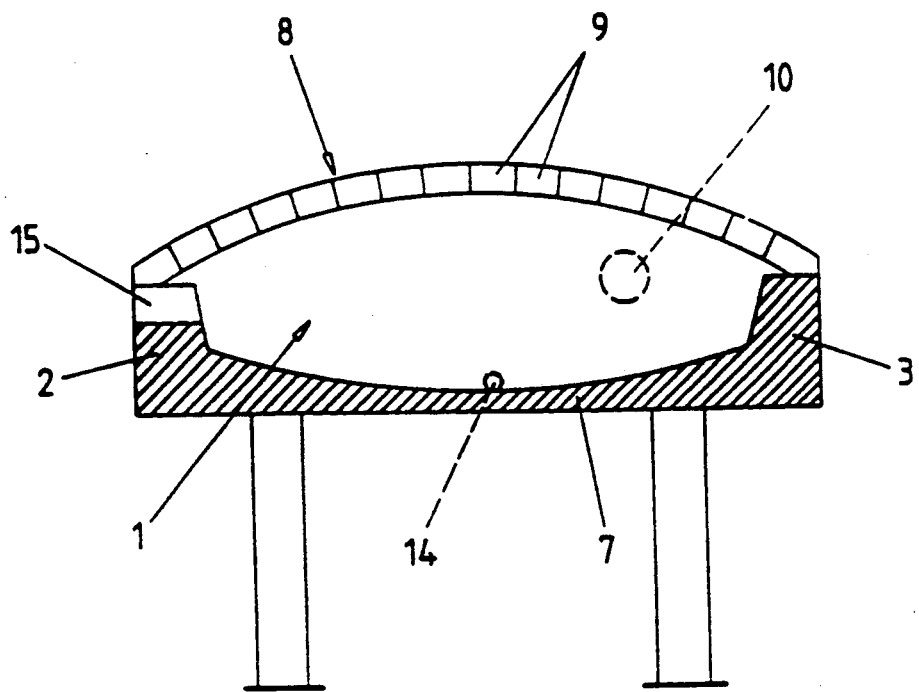

The invention will now be elucidated in detail with reference to the drawings. In the drawings:

FIG. 1 shows diagrammatically in horizontal cross-section an embodiment of a glaze-kiln system according to the invention, FIG. 2 shows a vertical cross-section according to II—II in FIG. 1, and FIG. 3 shows a vertical cross-section according to III—III in FIG. 1.

In the drawings the same reference numbers are used throughout.

In the drawings an embodiment is shown of a glaze-kiln system according to the invention. The actual kiln, generally indicated with 1, has thereby the shape of a relatively flat tub with side-walls 2, 3, and a front wall 4, a rear wall 5, which is provided with a gas discharge duct 6 at the upper side, and a bottom 7, all consisting of refractory material, resistant to high temperatures, required for glazing.

As can be seen in FIG. 2, the bottom 7 is sloping forwards and has a concave (FIG. 3) profile. This provides the advantage, that the fuse may flow towards the centre and forwards.

The tublike kiln 1 is closed at the upper side by a lid 8, consisting of separate, refractory bricks 9. This lid has a concave shape (FIG. 3), whereby an advantageous reflection of heat of the kiln back into the kiln is achieved.

In the front wall 4 is a burner aperture 10, to which lead two fuel ducts 11 and 12 and an air duct 13. By means of this burner 10, a hot blown flame is directed into the kiln. In order to achieve an efficient and as effectively as possible heating, the burner aperture 10 is positioned aside from the centre, horizontally oblique, so that an advantageously large surface area of the kiln can be covered.

In the front wall 4 there is an additional aperture 14 in the centre at the lower end and adjacent to the bottom 7, which serves for drawing-off fused metal alloy.

In the side-wall 2 there is at a higher level, a draw-off aperture for drawing off fluid glass slag.

The ash residues to be combusted are supplied via conveyer belts 16 and 17, which are shown only schematically. These conveyer belts convey the waste ash very slowly, and conveyer belt 17 emerges over a hopper 18, which empties via of an opening 19 in the lid 8 adjacent to the higher rear side of the kiln.

Behind the rear wall 5, showing a beveled interior surface, is a slag collector 20, intended to collect larger particles and unglazed slag.

Behind the slag collector 20 is a dust collecting chamber 21, in connection with the gas discharge duct 6, intended for dust removal from the discharged gas. This dust collecting chamber acts in addition as an air heater for the air, which is supplied to the burner 10 via the duct 13. The dust collecting chamber has entrance ports 22, in order to be able to clean or to repair the interior. In FIG. 1 there is shown a connection 23 for a second glaze-kiln (not shown). In this manner two glaze-kilns may be combined.

Finally the dust collecting chamber 21 is in connection with a chimney 24, provided with customary entrance ports 25 which are used for cleaning purposes.

During operation ash residues, derived from waste combustion and as far as required comminuted, are slowly supplied via conveyer belt system 16, 17 and disposed into the kiln via the hopper 18. In the meantime a strong blown flame is burning from the burner aperture 10, fed by the two fuel ducts 11 and 12 and the hot air duct 13. As fuel, waste fuels, such as methanol residues from the industry may possible be used. By the favourable shape of the kiln, an intensive heating by the blown flame occurs, whereby the entering ash material will gradually fuse and glaze. Moreover, metals present will be fused out for a substantial part. The fused fluid in the kiln will gradually flow to the lower located front wall 4, whereby during heating with the blown flame, additional metals will be fused out of the ash. These will collect as heavy liquid at the lower side, with on top thereof a layer of metal sulfide, with thereabove a glass fluid, resembling lava. It is of importance, that the viscosity of the fuse will not be too high, and to that end the fuse is continuously monitored, and if too high a viscosity is temporarily observed, supplement material, that will lower the viscosity, will be added to the ash mixture being supplied. In addition a layer of sand or polluted type of soil is spread over the bottom of the kiln, prior to making the kiln operative, in order to ensure that adequate silicates will be present to enhance the formation of glass. During this process the draw-off apertures 14 and 15 for fused metal and glass slag are closed and these may be opened periodically to draw-off fused metal and fused glass slag.

In addition to the glass slag, another slag is formed to a larger or lesser extent, which is not fluid but will sink into the fuse of glass slag and will drift at the lower side thereof. This slag may be removed periodically, which can be done in a simple manner by removing some elements 9 of the lid and then by pushing the slag with a type of shovel or brush towards the rear side and over the rear wall into the slag collector.

During the glazing process, unavoidably much gas is developed that is discharged via gas discharge duct 6 through the dust collecting chamber 21 and finally the chimney 24. This gas is subsequently passed to a gas washing installation for further purification.

From the products obtained, the drawn-off metal and the drawn-off glass, which is a synthetic obsidian, useful products may be manufactured again. The metal may be purified and separated electrolytically; the obsidian may be used for the manufacture of numerous objects, or may be processed in comminuted form into concrete, building materials for road-building, and the like. The metal present in this obsidian is completely bonded and immobilised and does not form any danger any more for the environment.

By combining the method, described hereinabove, with the methods described in the earlier mentioned Dutch Patent Applications Nos.89 02749 and 89 02490, a "niloption" process is approached for processing waste from the photographic industry, whereby efficiently waste materials will act against each other and at the end of the process substantially no detrimental residues are present any more. Such a method comprises the following steps:

(A) Combustible waste materials are processed together with uncombustible substances, muds, etc. in a pyrolysis combustion process according to Dutch Patent Application No.89 02749.

(B) Fluid waste materials are preprocessed and stripped of solvents, oils and heavy metals. The muds thus formed are further processed in pyrolysis combustion furnaces. The remaining residual liquids and possibly other residual liquids are used in composing a series of washing liquids, which are used to purify flue gases formed during the pyrolysis combustion process. Hereby the substances present in the washing liquids proper are decomposed. This method is described in the Dutch Patent Application No.89 02490.

(C) The ash, formed by various batches, is mixed with supplements, such as glass waste, Chile saltpetre, borax, etc. in order to obtain a mixture, that on fusion will provide a homogeneous slag with low viscosity. Subsequently this mixture is subjected to a glazing treatment as described in the preceding paragraphs. The products thus obtained, metal and obsidian, are fully suitable for re-use.

Thus a total system is obtained wherein many waste materials may be processed acting against each other for obtaining specific cleaning or purification effects, while the finally remaining products are fully harmless to the environment and are suitable for re-use.

I claim:

1. A method for processing a non-homogeneous ash mixture having unmeltable pieces, comprising the steps of:
   (a) supplying said ash mixture into a kiln having a sloping bottom, said ash mixture being supplied near a high side of said sloping bottom;
   (b) heating said ash mixture;
   (c) fusing said ash mixture;
   (d) removing fluid metals from said fused ash mixture, said fluid metals flowing to a lower side of said sloping bottom;
   (e) glazing said ash mixture to form a glass fluid which is situated above said fluid metals.

2. A method according to claim 1, further comprising the step of forming a layer of metal sulfide on top of said fluid metals.

3. A method according to claim 2, further comprising the step of removing said unmeltable pieces which are floating on top of said metal sulfide.

4. A method according to claim 1, wherein said ash mixture is heated with a blown flame.

5. A method according to claim 1, further comprising the step of mixing said ash mixture with polluted types of soil.

6. A method according to claim 1, further comprising the step of adjusting the viscosity of said fused ash mixture by adding supplements to said ash mixture.

7. A method according to claim 6, wherein the supplements added consist of at least one glass waste, sodium, potassium, calcium nitrate, borax, sulfites, silicon compounds, fluorides, iron and iron compounds.

8. A method according to claim 6, wherein the supplements added are less than 20% by weight.

9. A method according to claim 6, wherein the supplements added are not greater than 5% by weight.

10. A method according to claim 7, wherein the supplement added is borax.

11. A method according to claim 1, further comprising the steps of periodically drawing off said fluid metals near said lower side; and periodically drawing off said glass fluid at a point which is higher than where said fluid metals are drawn off.

12. A method according to claim 11, further comprising the step of pouring the drawn-off fluid metals into electrolysis anodes, and subsequently electronically purifying and separating said drawn-off fluid metals.

13. A method according to claim 11, further comprising the step of cooling said drawn-off glass fluid and then comminuting said drawn-off glass fluid for use as a raw material.

14. A method according to claim 1, wherein gases are produced during the fusion of said ash material, and further comprising the step of cleaning said gases by gas washing.

15. A method according to claim 14, wherein said gas washing step includes spraying waste liquids of fixing baths into said gases.

* * * * *